(12) United States Patent
Porkka

(10) Patent No.: US 7,058,955 B2
(45) Date of Patent: Jun. 6, 2006

(54) METHOD AND SYSTEM FOR PASSING MESSAGES BETWEEN THREADS

(75) Inventor: Joseph A Porkka, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 617 days.

(21) Appl. No.: 09/731,690

(22) Filed: Dec. 6, 2000

(65) Prior Publication Data

US 2002/0069302 A1 Jun. 6, 2002

(51) Int. Cl.
*G06F 9/46* (2006.01)

(52) U.S. Cl. ............. 719/314; 717/115; 717/140

(58) Field of Classification Search ........... 709/1–320; 717/114–119, 136–147; 719/312–315; 345/700–866; 718/102–104

See application file for complete search history.

(56) References Cited

U.S. PATENT DOCUMENTS

| | | | | |
|---|---|---|---|---|
| 5,261,097 A | * | 11/1993 | Saxon | 718/106 |
| 5,848,234 A | * | 12/1998 | Chernick et al. | 709/203 |
| 5,881,286 A | * | 3/1999 | Kougiouris et al. | 719/312 |
| 5,911,066 A | * | 6/1999 | Williams et al. | 719/310 |
| 6,029,205 A | * | 2/2000 | Alferness et al. | 709/310 |
| 6,141,793 A | * | 10/2000 | Bryant et al. | 717/115 |
| 6,151,616 A | * | 11/2000 | Senn et al. | 715/516 |
| 6,668,275 B1 | * | 12/2003 | Alsup et al. | 709/208 |
| 6,728,722 B1 | * | 4/2004 | Shaylor | 707/101 |

OTHER PUBLICATIONS

Carey, Rikk et al., "The Annotated VRML 97 Reference Manual", http://www.best.com/~rikk/Book/ch2-212.htm, (Jun. 1997), pp. 1-16.
Cohen et al., *Win32 Multithreaded Programming*, O'Reilly & Associates (1998), pp. 303-304.
Custer, Helen, *Inside Windows NT*, Microsoft Press (1993), p. 95.
Mauro, Jim, "Demangling Message Queues," *SunWorld*, http://www.sunworld.com/swol-11-1997/swol-11-insidesolaris_p.html, (Nov. 1997), pp. 1-10.
Richter, Jeffrey, *Advanced Windows*, Microsoft Press (1997), pp. 470-498.
Baker, Dan, *AMIGA ROM Kernal Reference Manual; Includes and Autodocs*, Addison-Wesley Publishing Company, Inc (1991), pp. 653-666, Third Edition.
Baker, Dan, *AMIGA ROM Kernal Reference Manual; Libraries*, Addison-Wesley Publishing Company, Inc. (1991), pp. 429-440, 481-508, Third Edition.

* cited by examiner

*Primary Examiner*—William Thomson
*Assistant Examiner*—Charles Anya
(74) *Attorney, Agent, or Firm*—Lee & Hayes, PLLC

(57) ABSTRACT

A method and system for passing messages between threads is provided, in which a sending thread communicates with a receiving thread by passing a reference to the message to a message queue associated with the receiving thread. The reference may be passed without explicitly invoking the inter-process or inter-thread message passing services of the computer's operating system. The sending thread may also have a message queue associated with it, and the sending thread's queue may include a reference to the receiving thread's queue. The sending thread can use this reference to pass messages to the receiving thread's queue.

21 Claims, 5 Drawing Sheets

METHOD AND SYSTEM FOR PASSING
MESSAGES BETWEEN THREADS

TECHNICAL FIELD

This invention relates generally to message passing between threads, and, more particularly, to passing messages between threads using a message queue.

BACKGROUND OF THE INVENTION

There are currently many schemes for allowing different threads of execution on a computer to communicate with one another. Typically, these schemes involve using the message passing mechanisms of the computer's operating system. However, there are many situations in which it is not desirable to call on these mechanisms from directly within a program. An example of such a situation is when the threads that wish to communicate are scripting threads. Scripting threads are simply threads that execute according to a scripting language, such as JavaScript or PERL. Programmers often prefer to use scripting languages rather than compiled languages because scripting languages hide a lot of the underlying complexity of the machines on which they run. This complexity is, instead, handled by the "script engine," which is the name often given to the program that interprets the script. If a script programmer is forced to rely explicitly on the message passing facilities of the operating system, then he runs the risk of reintroducing some of the complexity that he sought to avoid by choosing a script language in the first place.

Thus it can be seen that there is a need for a method and system for passing messages between threads that avoids the above-mentioned disadvantages.

SUMMARY OF THE INVENTION

In accordance with this need, a method and system for passing messages between threads is provided. According to the method and system, a sending thread interprets a block of source and, according to the source code, communicates with a receiving thread by passing a reference to the message to a message queue associated with the receiving thread. The reference may be passed without explicitly invoking the inter-process or inter-thread message passing services of the computer's operating system from within the block of source code. The sending thread may also have a message queue associated with it, and the sending thread's queue may include a reference to the receiving thread's queue. The sending thread can use this reference to pass messages to the receiving thread's queue.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

The invention is generally directed to a method and system for passing messages asynchronously from one thread to another without explicitly invoking the message passing mechanisms of an operating system from within the source code of the sending thread. In an embodiment of the invention, the receiving thread has a queue for holding messages and the sending thread has the address (in the form of a "reference") of the receiving thread's queue. The sending thread passes, by reference, the message to the receiving thread's queue using this address. The invention may be used in conjunction with scripting threads.

Although it is not required, the invention may be implemented by computer-executable instructions, such as program modules, that are executed by a computer. Generally, program modules include routines, programs, objects, components, data structures and the like that perform particular tasks or implement particular abstract data types. On many computers, modules execute within an address space of the computer's memory, which is typically defined as a "process." The point of execution of the program instructions is often referred to as a "thread." As is conventional, multiple threads of execution may exist for a single program in a process. Multiple processes may be executed on a single machine, with each process having one or more threads of execution. Thus, when communication between threads is discussed herein, it may mean communication between threads in a single process or communication between threads in different processes.

In this description, reference will be made to one or more "objects" performing functions on a computer. An "object" is a programming unit used in many modern programming languages. Objects may also execute on a computer as part of a process, procedure, and may be manifested as executable code, a DLL, an applet, native instruction, module, thread, or the like.

The invention may be implemented on a variety of types of computers, including personal computers (PCs), handheld devices, multi-processor systems, microprocessor-based on programmable consumer electronics, network PCs, minicomputers, mainframe computers and the like. The invention may also be employed in distributed computing environments, where tasks are performed by remote processing devices that are linked through a communications network. In a distributed computing environment, modules may be located in both local and remote memory storage devices.

Figure 1:
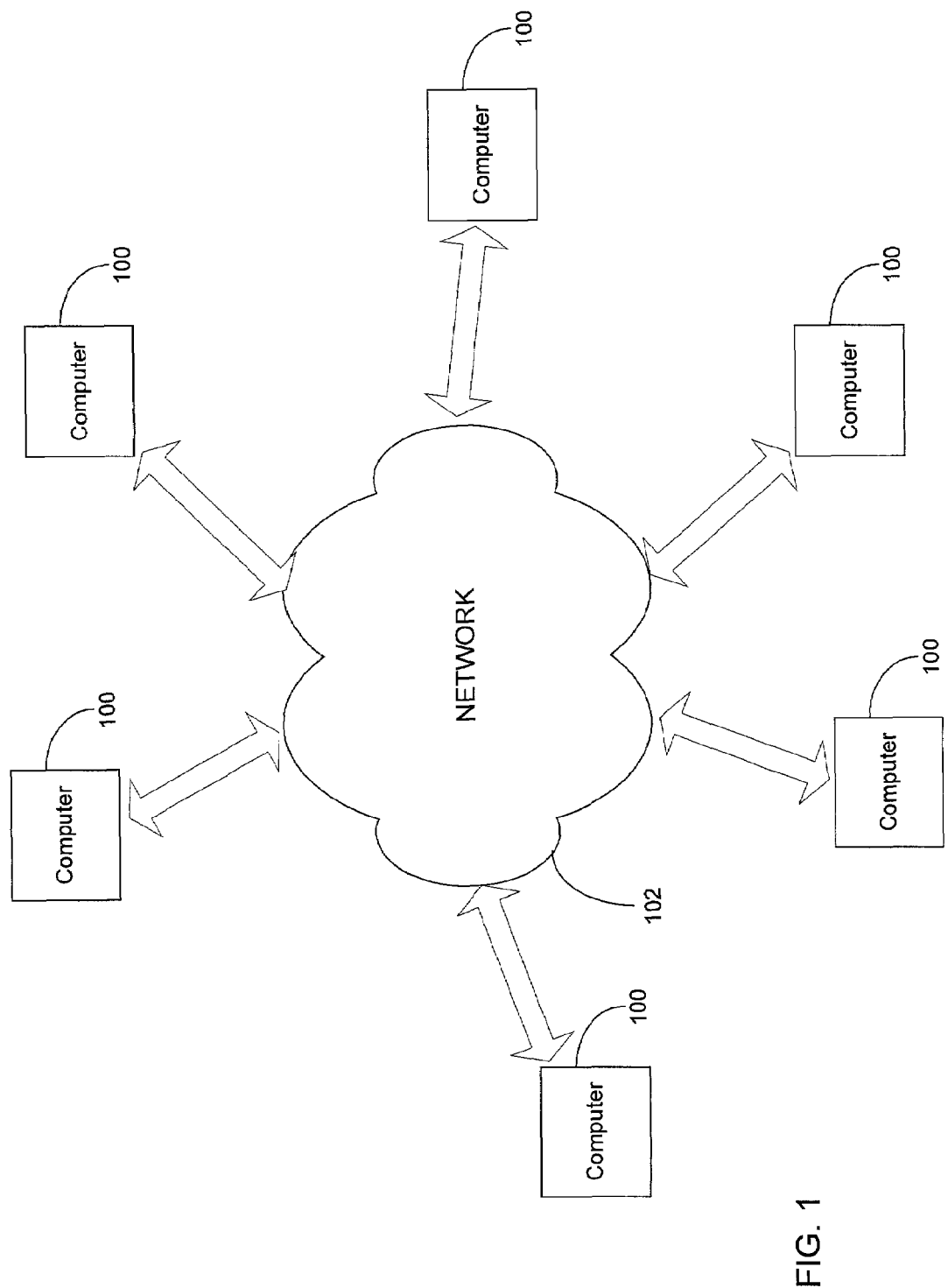
FIG. 1 is an example of a network.

An example of a networked environment in which this system may be used will now be described with reference to FIG. 1. The example network includes several computers 100 communicating with one another over a network 102, represented by a cloud. Network 102 may include many well-known components, such as routers, gateways, hubs, etc. and may allow the computers 100 to communicate via wired and/or wireless media.

Figure 2:
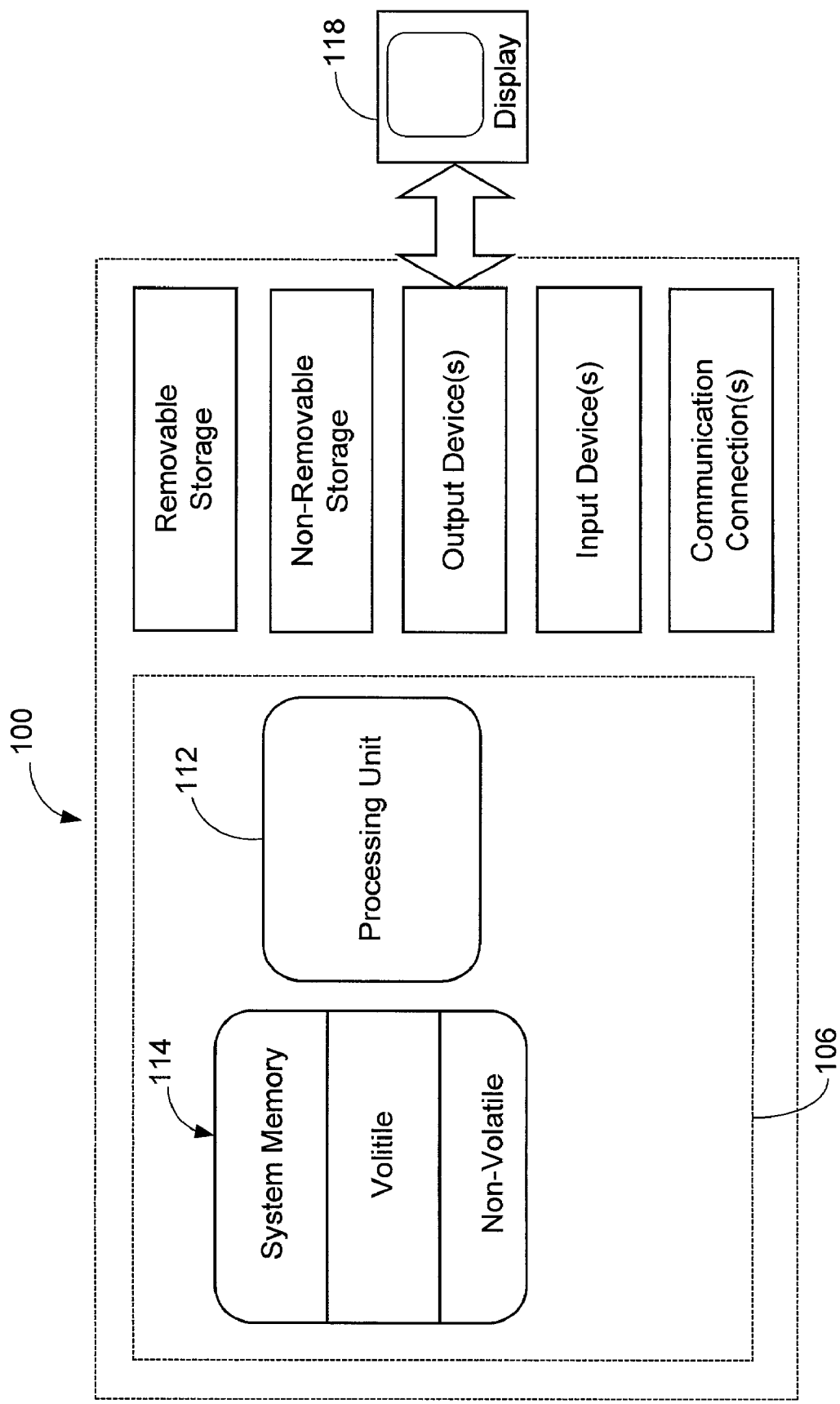
FIG. 2 is an example of a computer.

Referring to FIG. 2, an example of a basic configuration for a computer on which the system described herein may be implemented is shown. In its most basic configuration, the computer 100 typically includes at least one processing unit 112 and memory 114. Depending on the exact configuration and type of the computer 100, the memory 114 may be volatile (such as RAM), non-volatile (such as ROM or flash memory) or some combination of the two. This most basic configuration is illustrated in FIG. 2 by dashed line 106. Additionally, the computer may also have additional features/functionality. For example, computer 100 may also include additional storage (removable and/or non-removable) including, but not limited to, magnetic or optical disks or tape. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 100. Any such computer storage media may be part of computer 100.

Computer 100 may also contain communications connections that allow the device to communicate with other devices. A communication connection is an example of a communication medium. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media.

Computer 100 may also have input devices such as a keyboard, mouse, pen, voice input device, touch input device, etc. Output devices such as a display 116, speakers, a printer, etc. may also be included. All these devices are well known in the art and need not be discussed at length here.

Figure 3:
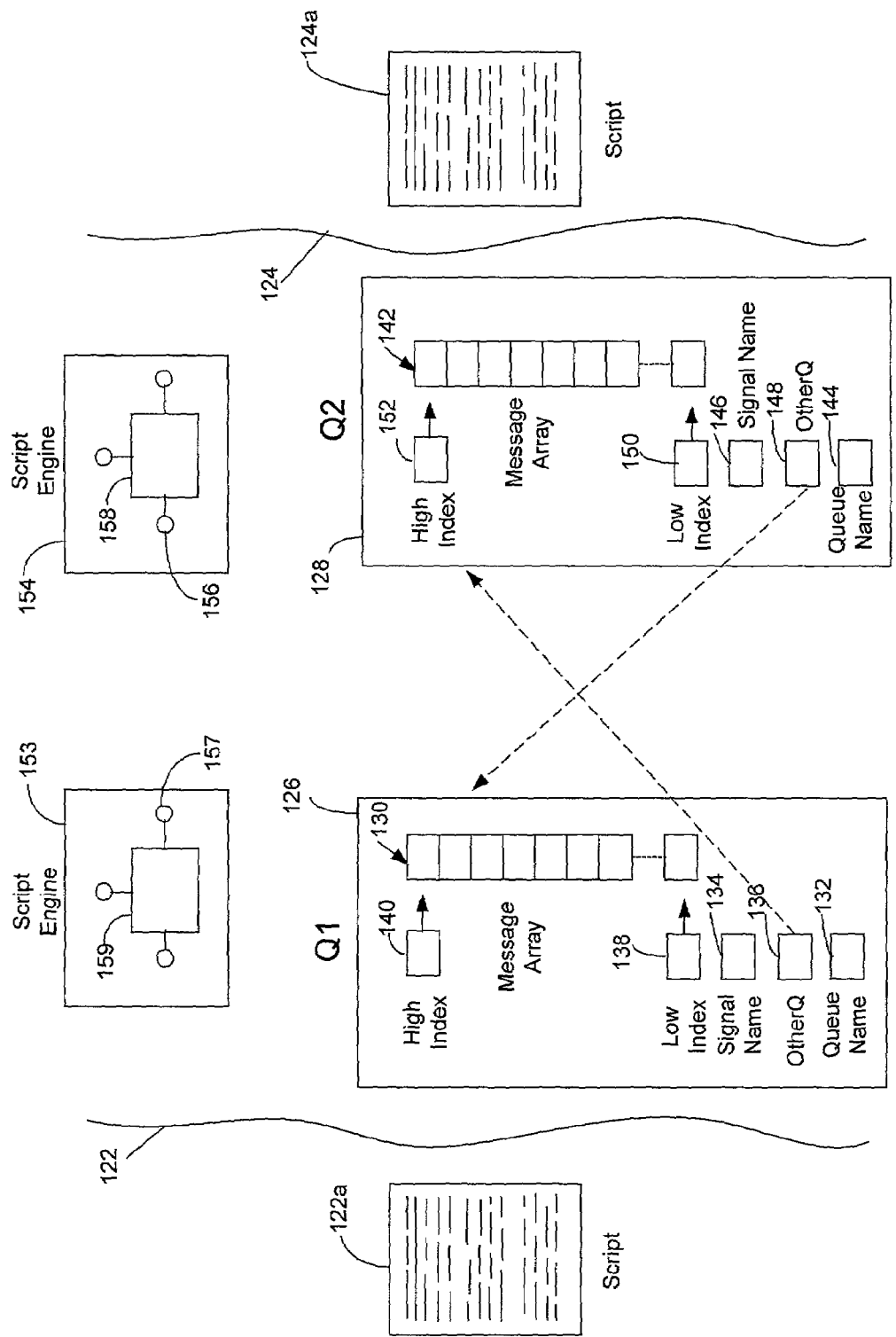
FIG. 3 is an example of a software architecture.

The technology described herein may be implemented in a variety of ways. FIG. 3 shows an architecture that may be used in the context of scripting threads. Its basic components include a first instance 153 of a script engine executing in a first thread 122, and a second instance 154 of the script engine executing in a second thread 124. The first and second instances will hereinafter be referred to as script engine 153 and script engine 154, respectively. As discussed in the background section, a script engine is a program that interprets script and executes operations on a computer according to the script. Implementations of a script engine include, but are not limited to, a JScript engine, a VBScript engine, and a PERL engine. The basic components further include a queue 126 that exists within the thread 122, and a queue 128 that exists within the thread 124.

Threads 122 and 124 may be executing on the same machine or on separate machines in communication with one another. To execute thread 122, the script engine 153 interprets and acts upon the block of script 122a. To execute thread 124, the script engine 154 interprets and acts upon block of script 124a. The script engines 153 and 154 interpret the text of the script blocks 122a and 124a in a well-known manner. For the purposes of this description, the script engines 153 and 154 are assumed to be instances of a JScript engine, and the script blocks 122a and 124a are assumed to be blocks of JScript. Any suitable type of scripting engine and scripting language may be used, however.

Queue 126 includes the following objects: an array 130 of messages received from thread 124 and not yet processed by thread 122; a string data structure 132 containing the name for the queue 126; a string data structure 134 containing the name of the signal that tells the queue 126 when a message has arrived; a reference variable 136 containing the address of the queue 128; a low index 138 containing the address of the oldest message in the queue 126; and a high index 140 containing the address of the message most recently added to the queue 126.

Queue 128 includes the following objects: an array 142 of messages received from thread 122 and not yet processed by thread 124; a string data structure 144 containing the name for the queue 128; a string data structure 146 containing the name of the signal that tells the queue 128 when a message has arrived; a reference variable 148 containing the address of the queue 126; a low index 150 containing the address of the oldest message in the queue 128; and a high index 152 containing the address of the message most recently added to the queue 128.

To initialize the above-described data structures according to an embodiment of the invention, one of the threads creates its own queue object and then sends the address of this object (in the form of a reference) to the second thread. The second thread then creates its own queue object and completes the initialization by cross-referencing its queue with the queue of the first thread. For example, in the embodiment illustrated in FIG. 3, references can be passed from thread 122 to thread 124 via the IDispatch interface 157 of a COM object 159 that is defined within the script engine 153. Similarly, the script engine 154 can pass a reference from thread 124 to thread 122 via the IDispatch interface 156 of a COM object 158 that is defined within the script engine 154. Accordingly, the references 136 and 148 referred to above may, for example, be implemented by the script engine 154 as IDispatch COM interfaces. COM objects are platform-independent, and the IDispatch interface allows references to objects to be passed across thread, process and machine boundaries. Any other cross-platform object or mechanism may be used, however.

For one thread to send a message to another thread according to an embodiment of the invention, the sending thread creates a message object, and inserts the message—which includes a string of characters—into the message object. The sending thread then passes a reference (via the IDispatch interface, for example) to the message object to the message queue of the receiving thread. The sending thread then increments the high index of the receiving thread's queue. The sending thread will already have a reference to the receiving thread's queue, having acquired the reference during an initialization procedure, such as the one described above. Once the message is sent, the sending thread need not keep the reference to the message. If, however, the sending thread wishes to wait until it receives a reply to the messages, then it is preferable that the sending thread maintains the reference to the message. The sending thread may then periodically check the sent message to see if a "reply" flag has been set.

To check for the presence of a new message according to an embodiment of the invention, the receiving thread compares the low index and the high index of the queue. If they are not equal, then there is at least one message in the queue. The receiving thread may retrieve a received message, reply if necessary, delete the reference to the message, and increment the low index. To reply to the message, the receiving thread flags the message as "replied," and sends the message back to the original sending thread's queue.

In order to conserve processor resources according to an embodiment of the invention, the sending thread sends a signal to the receiving thread in conjunction with sending a message. The signal indicates to the receiving thread that a new message has been sent. This signaling may take the form of a Java script "send event" command. Signaling in this manner allows the receiving thread to simply check the queue when necessary, rather than constantly checking for incoming messages.

Figure 4:
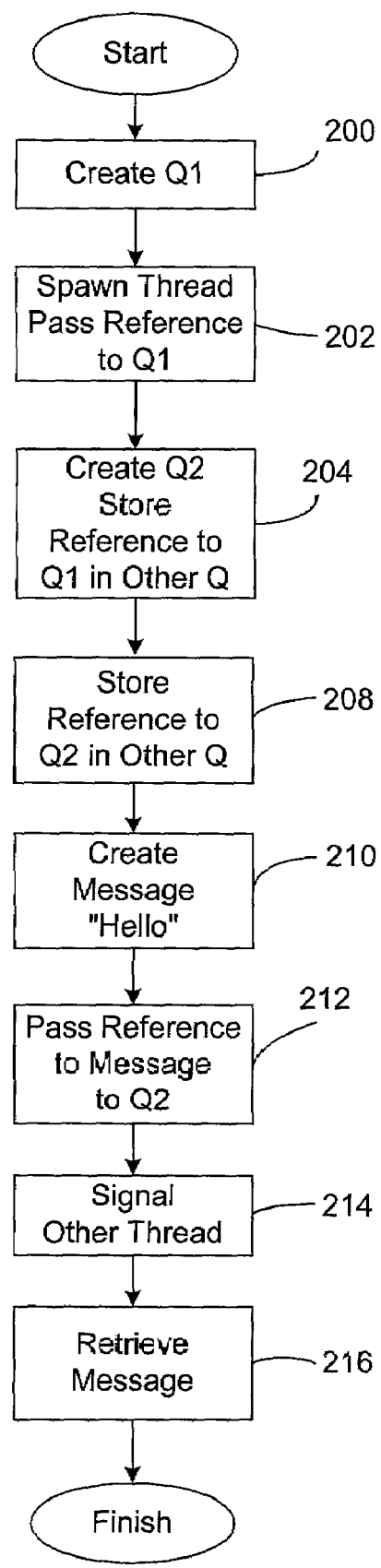
FIG. 4 is an example of steps that may be followed for passing a message from one thread to another; and, FIG. 5 is an example of a system for compiling a program.

Referring to the flowchart of FIG. 4, as well as the diagram of FIG. 3, an example of how communication between two threads is initialized and conducted according to an embodiment of the invention will now be described. At step 200 (FIG. 4), thread 122 creates a message queue, labeled "Q1" (Item 126 in FIG. 3). At step 202, thread 122 spawns thread 124 and passes a reference to Q1 to thread 124 via the IDispatch interface 157. At step 204, thread 124 creates its own queue, labeled "Q2" (Item 128 in FIG. 3) and stores the reference to Q1 in a data structure labeled "OtherQ" (Item 148 in FIG. 3). At step 208, thread 124 stores the reference to Q2 in another instance of "OtherQ" (Item 136 in FIG. 3). At step 210, thread 122 creates a message object (not illustrated) containing the text "HELLO." At step 212, thread 122 passes a reference to the message object—which, in most programming languages is simply the address of the object—to thread 124 for placement in Q2. The thread 122 then sends a signal to the thread 124 to indicate the presence of a new message at step 212. At step 214, thread 124 retrieves the message object 250 using the reference, and the process is complete.

An example of how an embodiment of the invention may be used in compiling a program will now be described with reference to FIG. 5. A server computer 160 is in communication with client computers 162, 164, 166 and 168, and console computer 180. Each client computer is responsible for compiling a section of a program. In this example, the program is divided into four sections: networking, kernel, user interface, and developer tools. These sections are compiled by client computers 162, 164, 166 and 168 respectively. The server computer 160 coordinates the activities of the client computers through the use of JScript commands. To accomplish this, the server computer executes a JScript engine 182 along five different threads of execution, labeled 170, 172, 174, 176 and 178. Consequently, each thread runs a copy of the JScript engine 182. Each copy includes one or more COM objects, such as COM object 184, for passing references to objects to other threads. Each of the threads 172, 174, 176 and 178 also includes a queue structured like the queues 126 and 128 of FIG. 3. Thread 170 includes a queue for each of the threads 172, 174, 176 and 178. In other words, thread 170 has a queue for communicating with thread 172, a queue for communicating with thread 174, and so on. Threads 172, 174, 176 and 178 are responsible for executing scripting commands to control the compiling operations of client computers 162, 164, 166 and 168 respectively, while thread 170 is responsible for sending commands to coordinate the activities of the other threads. The types of commands sent by thread 170 include: "Start," for starting the execution of a thread; "Abort," for aborting the execution of a thread; and "Ignore error," to cause a thread to ignore an encountered error and continue its compiling operations.

Figure 5:
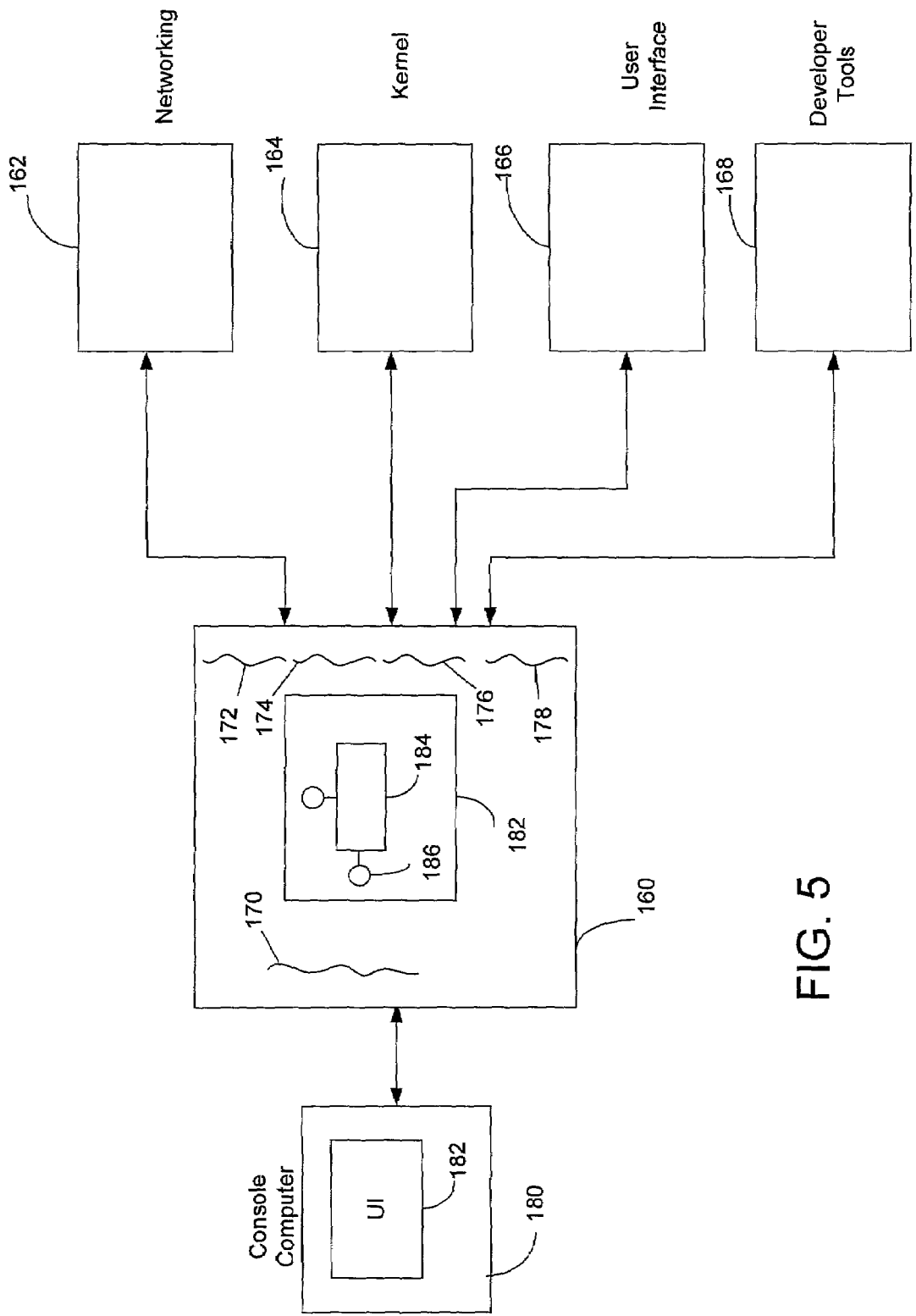

The setup shown in FIG. 5 allows the thread 170 to send commands to each of the other threads in parallel. For example, it can send a "start" command to thread 172, and then send a "start" command to thread 174 without having to wait for thread 172 to have acted on its command. Once all of the "start" commands have been sent, the thread 170 can then update the status of the compiling operation on a user interface 182 of a console computer 180. This embodiment also helps solve problems related to the interdependency of the various sections of the program. For example, in a conventional compiling operation, the networking section of the program could not start compiling until the application programming interfaces (APIs) required for networking were defined in the kernel section. This would mean that no compiling could be accomplished on the networking section until the kernel section was complete. In the setup of FIG. 5, however, the networking section can be at least partially compiled in parallel with the kernel section until the APIs were needed.

It can thus be seen that a new a useful method and system for passing messages between threads has been provided. In view of the many possible embodiments to which the principles of this invention may be applied, it should be recognized that the embodiments described herein with respect to the drawing figures is meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

I claim:

1. A computer-implemented method for passing a message from a first thread of execution in a process to a second thread of execution in the process, comprising:
   instantiating a first thread queue for holding messages, the first thread queue being associated with the first thread of execution;
   obtaining a first address associated with the first thread queue;
   sending the first address to the second thread of execution, the second thread of execution being configured to create a second thread queue, to obtain a second address associated with the second thread queue, and to store the first address;
   receiving the second address from the second thread in response to sending the first address;
   creating the message at the first thread of execution in the process;
   obtaining a reference associated with the message;
   placing the reference into the second thread queue, wherein the reference is usable by the second thread of execution to access the message.

2. The computer-implemented method of claim 1, wherein placing the reference comprises placing the reference into the second thread queue based on the second address.

3. The computer-implemented method of claim 1, further comprising sending another message from the second thread to the first thread based on the first address.

4. The computer-implemented method of claim 1 further comprising: sending a signal to the second thread of execution to indicate that the message has been sent to the second thread of execution.

5. The computer-implemented method of claim 4, wherein the signal is sent via a platform-independent object.

6. The computer-implemented method of claim 1, wherein creating the message comprises:
defining a message object for holding the message; and
inserting the message into the message object.

7. A method for passing intraprocess messages between scripting threads in a process residing in a computer, the method comprising:
creating a first scripting thread of execution;
creating a first thread queue for the first scripting thread;
obtaining a first address associated with the first thread queue;
creating a second scripting thread of execution;
passing, to the second scripting thread, the first address for use by the second scripting thread to send messages to the first scripting thread;
creating a second thread queue for the second scripting thread;
obtaining a second address associated with the second thread queue; and
passing, to the first scripting thread, the second address for use by the first scripting thread to send messages to the second scripting thread.

8. The method of claim 7 further comprising:
creating a message object;
inserting the message from the first scripting thread into the message object;
obtaining reference to the message object; and
placing the reference into the second thread queue so that the second scripting thread can access the message.

9. The method of claim 8 further comprising:
sending a signal from the first scripting thread to the second scripting thread to indicate to the second scripting thread that the message has been sent to the second scripting thread.

10. The method of claim 8, wherein in response to the message further comprising:
inserting a flag in the message object to indicate that the message object is being responded to; and placing a reference to the message object into the first thread queue.

11. A method for compiling a program having a plurality of sections, the method comprising:
creating one of a plurality of scripting threads for each section of the program, each scripting threads executes an associated script for compiling the associated section, wherein each script is independent of the program;
creating a control thread to asynchronously communicate with each of the plurality of scripting threads so that commands can be issued from the control thread to the plurality of scripting threads in parallel, wherein asynchronously communicating with each of the plurality of scripting threads via a plurality of message queues, each scripting thread being associated with a scripting thread queue of the plurality of message queues and the control thread being associated with at least one control thread queue of the plurality of message queues, thereby resolving interdependencies among different sections of the program that are being compiled;
providing the control thread a reference to each scripting thread queue;
providing each scripting thread a reference to a corresponding control thread queue of the plurality of control thread queues, thereby enabling the control thread to put at least one message in each scripting thread queue and each scripting thread to put a response message in its corresponding control thread queue; and
interpreting each script using a script engine, the script engine having an inter-thread signaling mechanism, wherein the control thread uses the signaling mechanism to alert one of the plurality of scripting threads whenever the control thread has sent a message to the one scripting thread.

12. The method of claim 11 further comprising:
at the control thread, sending updates to a user interface; and
processing commands from the user interface in parallel with asynchronously sending commands to the scripting threads.

13. A system for compiling a program having a plurality of sections, the system comprising:
a computer;
a plurality of scripts, each script for compiling one section of the program, wherein each script is independent of the program;
a plurality of scripting threads executing on the computer, each scripting thread being associated with one of the plurality of scripts, wherein each section of the program is compiled under the direction of the associated script executed by the associated scripting thread;
a control thread executing on the computer for coordinating the activity of the plurality of scripting threads by communicating asynchronously with the plurality of scripting threads via a plurality of message queues, thereby resolving interdependencies among different sections of the program that are being compiled, wherein the control thread is associated with one or more control thread queues of the plurality of message queues and each scripting thread is associated with a scripting thread queue of the plurality of message queues, the control thread has a reference to each scripting thread queue;
each scripting thread has a reference to a corresponding control thread queue of the plurality of control thread queues, thereby enabling the control thread to put one or more of the messages in each scripting thread queue and each scripting thread to put a response messages in its corresponding control thread queue; and
a script engine executing on the computer to interpret the script, the script engine having an inter-thread signaling mechanism, wherein the control thread uses the signaling mechanism to alert one of the scripting threads whenever the control thread has sent a message to the one scripting thread.

14. The system of claim 13, wherein communicating asynchronously occurs via an interface of a cross-platform object.

15. The system of claim 13, wherein the computer is a first computer, the system further comprising: at least one second computer in communication with the first computer, wherein at least one of the scripting threads executes on the second computer.

16. The system of claim 15 further comprising:
a network link for enabling the first and second computers to communicate with one another;
a means for allowing the scripting thread executing on the second computer to communicate across the network link with the control thread executing on the first computer.

17. The system of claim 13 further comprising: a user interface, wherein the control thread is operable to update the user interface without having to wait for the scripting threads to act on messages sent to them by the control thread.

18. A computer readable storage medium having computer executable instructions; the computer executable instructions performing a method for passing intraprocess messages between scripting threads in a process, the method comprising:

creating a first scripting thread of execution;

creating a first thread queue for the first scripting thread;

obtaining a first address associated with the first thread queue;

creating a second scripting thread of execution;

passing, to the second scripting thread, the first address for use by the second scripting thread to send messages to the first scripting thread;

creating a second thread queue for the second scripting thread;

obtaining a second address associated with the second thread queue; and passing, to the first scripting thread, the second address for use by the first scripting thread to send messages to the second scripting thread.

19. The computer readable storage medium of 18, further comprising: creating a message object;

inserting the message from the first scripting thread into the message object;

obtaining a reference to the message object; and placing the reference into the second thread queue so that the second scripting thread can access the message.

20. The computer readable storage medium of 18, further comprising:

sending a signal from the first scripting thread to the second scripting thread to indicate to the second scripting thread that the message has been sent to the sent to the second scripting thread.

21. The computer readable storage medium of 18, further comprising:

inserting a flag in the message object to indicate that the message object is being responded to; and placing a reference to the message object into the first thread queue.

* * * * *